(12) United States Patent
Lambourne et al.

(10) Patent No.: US 8,588,949 B2
(45) Date of Patent: Nov. 19, 2013

(54) METHOD AND APPARATUS FOR ADJUSTING VOLUME LEVELS IN A MULTI-ZONE SYSTEM

(75) Inventors: Robert A. Lambourne, Santa Barbara, CA (US); Nicholas A. J. Millington, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

(21) Appl. No.: 13/619,237

(22) Filed: Sep. 14, 2012

(65) Prior Publication Data

US 2013/0014015 A1    Jan. 10, 2013

Related U.S. Application Data

(63) Continuation of application No. 12/035,112, filed on Feb. 21, 2008, now Pat. No. 8,290,603, which is a continuation-in-part of application No. 10/861,653, filed on Jun. 5, 2004, now Pat. No. 7,571,014, which is a continuation-in-part of application No. 10/816,217, filed on Apr. 1, 2004, now Pat. No. 8,234,395.

(60) Provisional application No. 60/490,768, filed on Jul. 28, 2003.

(51) Int. Cl.
*G06F 17/00*    (2006.01)

(52) U.S. Cl.
USPC ............. 700/94; 381/104; 381/105; 381/106; 381/107; 381/108; 381/109; 715/716

(58) Field of Classification Search
USPC .......................................................... 700/94
See application file for complete search history.

(56) References Cited

U.S. PATENT DOCUMENTS

| 4,296,278 A | 10/1981 | Cullison et al. |
| 4,816,989 A | 3/1989 | Finn et al. |
| 5,182,552 A | 1/1993 | Paynting |

(Continued)

FOREIGN PATENT DOCUMENTS

| EP | 0251584 A2 | 1/1988 |
| EP | 0672985 A1 | 9/1995 |

(Continued)

OTHER PUBLICATIONS

Yamaha DME 32 manual: copyright 2001.*

(Continued)

*Primary Examiner* — Paul McCord
(74) *Attorney, Agent, or Firm* — TechLaw LLP; Robert J. Irvine, III

(57) ABSTRACT

A multimedia controller including a processor, the controller configured to: provide a user interface for a player group, wherein the player group includes a plurality of players in a local area network, and wherein each player is configured to playback a multimedia output from a multimedia source; accept an input to facilitate formation of the player group, indicating that at least two of the players in the local area network are to be included in the player group; for each of the plurality of players within the player group, accept an input to adjust a volume associated with the player, that causes the player to adjust its volume; and accept an input to adjust a volume associated with the player group, wherein the input to adjust the volume associated with the group causes the players in the player group to adjust their volumes.

20 Claims, 14 Drawing Sheets

(56) References Cited

U.S. PATENT DOCUMENTS

| | | | |
|---|---|---|---|
| 5,406,634 A | 4/1995 | Anderson et al. | |
| 5,440,644 A | 8/1995 | Farinelli et al. | |
| 5,467,342 A | 11/1995 | Logston et al. | |
| 5,491,839 A | 2/1996 | Schotz | |
| 5,553,222 A | 9/1996 | Milne et al. | |
| 5,668,884 A | 9/1997 | Clair, Jr. et al. | |
| 5,673,323 A | 9/1997 | Schotz et al. | |
| 5,815,689 A | 9/1998 | Shaw et al. | |
| 5,867,691 A | 2/1999 | Shiraishi | |
| 5,875,354 A | 2/1999 | Charlton et al. | |
| 5,887,143 A | 3/1999 | Saito et al. | |
| 5,946,343 A * | 8/1999 | Schotz et al. | 375/141 |
| 6,009,457 A | 12/1999 | Moller | |
| 6,026,150 A | 2/2000 | Frank et al. | |
| 6,031,818 A | 2/2000 | Lo et al. | |
| 6,128,318 A | 10/2000 | Sato | |
| 6,157,957 A | 12/2000 | Berthaud | |
| 6,175,872 B1 | 1/2001 | Neumann et al. | |
| 6,185,737 B1 | 2/2001 | Northcutt et al. | |
| 6,195,436 B1 | 2/2001 | Scibora et al. | |
| 6,199,169 B1 | 3/2001 | Voth | |
| 6,256,554 B1 | 7/2001 | DiLorenzo | |
| 6,308,207 B1 | 10/2001 | Tseng et al. | |
| 6,324,586 B1 | 11/2001 | Johnson | |
| 6,332,147 B1 | 12/2001 | Moran et al. | |
| 6,351,821 B1 | 2/2002 | Voth | |
| 6,430,353 B1 | 8/2002 | Honda et al. | |
| 6,487,296 B1 | 11/2002 | Allen et al. | |
| 6,526,325 B1 | 2/2003 | Sussman et al. | |
| 6,587,127 B1 | 7/2003 | Leeke et al. | |
| 6,598,172 B1 | 7/2003 | VanDeusen et al. | |
| 6,611,537 B1 | 8/2003 | Edens et al. | |
| 6,631,410 B1 | 10/2003 | Kowalski et al. | |
| 6,674,803 B1 | 1/2004 | Kesselring | |
| 6,757,517 B2 | 6/2004 | Chang | |
| 6,778,869 B2 | 8/2004 | Champion | |
| 6,826,283 B1 | 11/2004 | Wheeler et al. | |
| 6,836,788 B2 | 12/2004 | Kim et al. | |
| 6,898,642 B2 | 5/2005 | Chafle et al. | |
| 6,912,610 B2 | 6/2005 | Spencer | |
| 6,920,373 B2 | 7/2005 | Xi et al. | |
| 6,934,766 B1 | 8/2005 | Russell | |
| 6,985,694 B1 | 1/2006 | De Bonet et al. | |
| 7,007,106 B1 | 2/2006 | Flood et al. | |
| 7,020,791 B1 | 3/2006 | Aweya et al. | |
| 7,043,651 B2 | 5/2006 | Aweya et al. | |
| 7,047,308 B2 | 5/2006 | Deshpande | |
| 7,115,017 B1 | 10/2006 | Laursen et al. | |
| 7,130,608 B2 | 10/2006 | Hollstrom et al. | |
| 7,162,315 B2 | 1/2007 | Gilbert | |
| 7,185,090 B2 | 2/2007 | Kowalski et al. | |
| 7,187,947 B1 | 3/2007 | White et al. | |
| 7,206,367 B1 | 4/2007 | Moore | |
| 7,209,795 B2 | 4/2007 | Sullivan et al. | |
| 7,218,708 B2 | 5/2007 | Berezowski et al. | |
| 7,312,785 B2 | 12/2007 | Tsuk et al. | |
| 7,324,857 B2 | 1/2008 | Goddard | |
| 7,333,519 B2 | 2/2008 | Sullivan et al. | |
| 7,372,846 B2 | 5/2008 | Zwack | |
| 7,392,102 B2 | 6/2008 | Sullivan et al. | |
| 7,571,014 B1 | 8/2009 | Lambourne et al. | |
| 7,643,894 B2 | 1/2010 | Braithwaite et al. | |
| 7,668,990 B2 | 2/2010 | Krzyzanowski et al. | |
| 7,675,943 B2 | 3/2010 | Mosig et al. | |
| 7,720,096 B2 | 5/2010 | Klemets | |
| 7,742,740 B2 | 6/2010 | Goldberg et al. | |
| 7,934,239 B1 | 4/2011 | Dagman | |
| 8,014,423 B2 | 9/2011 | Thaler et al. | |
| 8,045,952 B2 | 10/2011 | Qureshey et al. | |
| 8,050,652 B2 | 11/2011 | Qureshey et al. | |
| 8,074,253 B1 | 12/2011 | Nathan | |
| 8,086,752 B2 | 12/2011 | Millington et al. | |
| 8,103,009 B2 | 1/2012 | McCarty et al. | |
| 8,131,390 B2 | 3/2012 | Braithwaite et al. | |
| 8,234,395 B2 | 7/2012 | Millington | |
| 8,370,678 B2 | 2/2013 | Millington et al. | |
| 8,423,659 B2 | 4/2013 | Millington | |
| 2001/0009604 A1 | 7/2001 | Ando et al. | |
| 2001/0022823 A1 | 9/2001 | Renaud | |
| 2001/0032188 A1 | 10/2001 | Miyabe et al. | |
| 2002/0002039 A1 | 1/2002 | Qureshey et al. | |
| 2002/0002562 A1 | 1/2002 | Moran et al. | |
| 2002/0003548 A1 | 1/2002 | Krusche et al. | |
| 2002/0034374 A1 | 3/2002 | Barton | |
| 2002/0042844 A1 | 4/2002 | Chiazzese | |
| 2002/0065926 A1 | 5/2002 | Hackney et al. | |
| 2002/0073228 A1 | 6/2002 | Cognet et al. | |
| 2002/0090914 A1 | 7/2002 | Kang et al. | |
| 2002/0093478 A1 | 7/2002 | Yeh | |
| 2002/0112244 A1 | 8/2002 | Liou et al. | |
| 2002/0124097 A1 | 9/2002 | Isely et al. | |
| 2002/0129156 A1 | 9/2002 | Yoshikawa | |
| 2002/0143998 A1 | 10/2002 | Rajagopal et al. | |
| 2002/0163361 A1 | 11/2002 | Parkin | |
| 2002/0165921 A1 | 11/2002 | Sapieyevski | |
| 2003/0020763 A1 * | 1/2003 | Mayer et al. | 345/838 |
| 2003/0023741 A1 | 1/2003 | Tomassetti et al. | |
| 2003/0035444 A1 | 2/2003 | Zwack | |
| 2003/0041173 A1 | 2/2003 | Hoyle | |
| 2003/0041174 A1 | 2/2003 | Wen et al. | |
| 2003/0066094 A1 | 4/2003 | Van et al. | |
| 2003/0099212 A1 | 5/2003 | Anjum et al. | |
| 2003/0099221 A1 | 5/2003 | Rhee | |
| 2003/0126211 A1 | 7/2003 | Anttila et al. | |
| 2003/0195964 A1 | 10/2003 | Mane | |
| 2003/0198257 A1 | 10/2003 | Sullivan et al. | |
| 2003/0210796 A1 | 11/2003 | McCarty et al. | |
| 2003/0231871 A1 | 12/2003 | Ushimaru | |
| 2004/0001484 A1 | 1/2004 | Ozguner | |
| 2004/0001591 A1 | 1/2004 | Mani et al. | |
| 2004/0010727 A1 * | 1/2004 | Fujinami | 713/400 |
| 2004/0015252 A1 * | 1/2004 | Aiso et al. | 700/94 |
| 2004/0024925 A1 | 2/2004 | Cypher et al. | |
| 2004/0027166 A1 | 2/2004 | Mangum et al. | |
| 2004/0131192 A1 * | 7/2004 | Metcalf | 381/1 |
| 2004/0170383 A1 | 9/2004 | Mazur | |
| 2004/0203378 A1 | 10/2004 | Powers | |
| 2004/0249965 A1 | 12/2004 | Huggins et al. | |
| 2004/0249982 A1 | 12/2004 | Arnold et al. | |
| 2004/0252400 A1 | 12/2004 | Blank et al. | |
| 2005/0010691 A1 | 1/2005 | Oyadomari et al. | |
| 2005/0013394 A1 | 1/2005 | Rausch et al. | |
| 2005/0058149 A1 | 3/2005 | Howe | |
| 2005/0081213 A1 | 4/2005 | Suzuoki et al. | |
| 2005/0114538 A1 | 5/2005 | Rose | |
| 2005/0177643 A1 | 8/2005 | Xu | |
| 2005/0281255 A1 | 12/2005 | Davies et al. | |
| 2005/0283820 A1 | 12/2005 | Richards et al. | |
| 2005/0288805 A1 | 12/2005 | Moore et al. | |
| 2005/0289224 A1 | 12/2005 | Deslippe et al. | |
| 2007/0038999 A1 | 2/2007 | Millington et al. | |
| 2007/0054680 A1 | 3/2007 | Mo et al. | |
| 2007/0142022 A1 | 6/2007 | Madonna et al. | |
| 2007/0142944 A1 * | 6/2007 | Goldberg et al. | 700/94 |
| 2007/0271388 A1 | 11/2007 | Bowra et al. | |
| 2008/0120429 A1 | 5/2008 | Millington et al. | |
| 2008/0144861 A1 | 6/2008 | Melanson et al. | |
| 2009/0157905 A1 | 6/2009 | Davis | |
| 2009/0228919 A1 | 9/2009 | Zott et al. | |
| 2012/0029671 A1 | 2/2012 | Millington et al. | |

FOREIGN PATENT DOCUMENTS

| | | |
|---|---|---|
| EP | 1111527 A2 | 6/2001 |
| WO | 9525313 A1 | 9/1995 |
| WO | 9961985 A1 | 12/1999 |
| WO | 2005013047 A2 | 2/2005 |

OTHER PUBLICATIONS

Polycom Conference Composer manual; Copyright 2001.*

ID3 draft specificaiton; Copyright 1998.*

(56) References Cited

OTHER PUBLICATIONS

Akyildiz I.F., et al., "Multimedia Group Synchronization Protocols for Integrated Services Networks," IEEE Journal on Selected Areas in Communications, 1996, vol. 14 (1), pp. 162-173.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Benslimane A., "A Multimedia Synchronization Protocol for Multicast Groups," Proceedings of the 26th Euromicro Conference, 2000, vol. 1, pp. 456-463.
Biersack E., et al., "Intra- and Inter-Stream Synchronisation for Stored Multimedia Streams," IEEE International Conference on Multimedia Computing and Systems, 1996, pp. 372-381.
Bretl W.E., et al., MPEG2 Tutorial [online], 2000 [retrieved on Jan. 13, 2009] Retrieved from the Internet:< http://www.bretl.com/mpeghtml/MPEGindex.htm>, pp. 1-23.
Final Office Action mailed Jul. 13, 2009 for U.S. Appl. No. 10/816,217, filed Apr. 1, 2004.
"Final Office Action mailed Sep. 13, 2012 for U.S. Appl. No. 13/297,000", United States Patent and Trademark Office, Sep. 13, 2012, 17 pages.
Final Office Action mailed Oct. 21, 2011 for U.S. Appl. No. 10/816,217, filed Apr. 1, 2004.
Final Office Action mailed Jan. 28, 2011 for U.S. Appl. No. 10/816,217, filed Apr. 1, 2004.
Final Office Action mailed Jun. 30, 2008 for U.S. Appl. No. 10/816,217, filed Apr. 1, 2004.
Huang C.M., et al., "A Synchronization Infrastructure for Multicast Multimedia at the Presentation Layer," IEEE Transactions on Consumer Electronics, 1997, vol. 43 (3), pp. 370-380.
International Search Report for Application No. PCT/US04/23102, mailed on Aug. 1, 2008, 5 pages.
Ishibashi Y., "A Group Synchronization Mechanism for Live Media in Multicast Communications," IEEE Global Telecommunications Conference, 1997, vol. 2, pp. 746-752.
Ishibashi Y., "A Group Synchronization Mechanism for Stored Media in Multicast Communications," IEEE Information Revolution and Communications, 1997, vol. 2, pp. 692-700.
Jo J., et al., "Synchronized One-to-many Media Streaming with Adaptive Playout Control," Proceedings of SPIE, 2002, vol. 4861, pp. 71-82.
Mills D.L., "Network Time Protocol (Version 3) Specification, Implementation and Analysis," Network Working Group, Mar. 1992, <http://www.ietf.org/rfc/rfc1305.txt>.
Mills D.L., "Precision Synchronization of Computer Network Clocks," ACM SIGCOMM Computer Communication Review, 1994, vol. 24 (2), pp. 28-43.
Motorola., "Simplefi, Wireless Digital Audio Receiver, Installation and User Guide", Dec. 31, 2001.
Non-Final Office Action mailed Jan. 18, 2008 for U.S. Appl. No. 10/816,217, filed Apr. 1, 2004.
Non-Final Office Action mailed Jun. 21, 2011 for U.S. Appl. No. 10/816,217, filed Apr. 1, 2004.
Non-Final Office Action mailed Jan. 22, 2009 for U.S. Appl. No. 10/816,217, filed Apr. 1, 2004.
Non-Final Office Action mailed Jun. 25, 2010 for U.S. Appl. No. 10/816,217, filed Apr. 1, 2004.
Non-Final Office Action mailed Feb. 29, 2012 for U.S. Appl. No. 13/297,000, filed Nov. 15, 2011.
Notice of Allowance Dec. 27, 2011 for U.S. Appl. No. 10/816,217, filed Apr. 1, 2004.
Park S., et al., "Group Synchronization in MultiCast Media Communications," Proceedings of the 5th Research on Multicast Technology Workshop, 2003.
PRISMIQ; Inc., "PRISMIQ Media Player User Guide", 2003, 44 pages.
Rothermel K., et al., "An Adaptive Stream Synchronization Protocol," 5th International Workshop on Network and Operating System Support for Digital Audio and Video, 1995.
Schulzrinne H., et al., "RTP: A Transport Protocol for Real-Time Applications, RFC 3550," Network Working Group, 2003, pp. 1-89.
The MPEG-2 Transport Stream. Retrieved from the Internet:< URL: http://www.coolstf.com/mpeg/#ts>.
"UPnP; "Universal Plug and Play Device Architecture";Jun. 8, 2000; version 1.0; Microsoft Corporation; pp. 1-54".

* cited by examiner

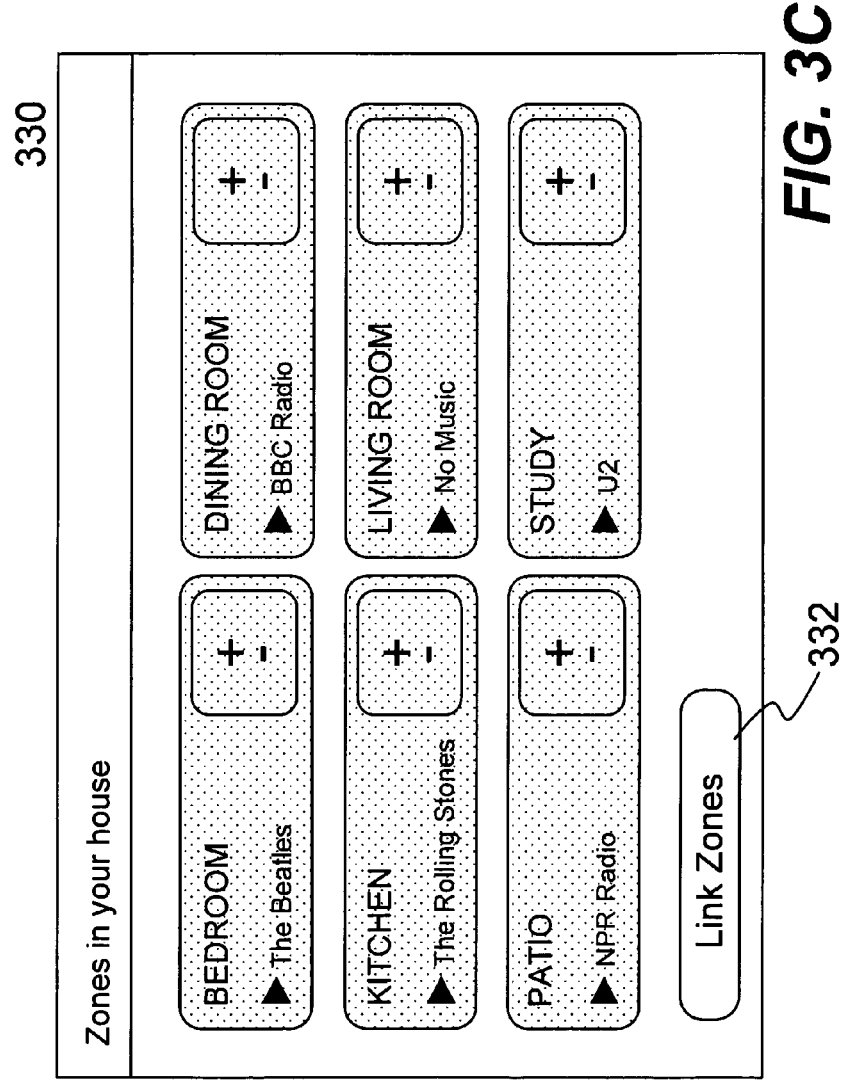

METHOD AND APPARATUS FOR ADJUSTING VOLUME LEVELS IN A MULTI-ZONE SYSTEM

CROSS-REFERENCE TO RELATED APPLICATION

This application is a Continuation of U.S. Ser. No. 12/035,112, entitled "User Interfaces For Controlling And Manipulating Groupings In A Multi-Zone Media System", filed Feb. 21, 2008, now U.S. Pat. No. 8,290,603, which is a Continuation-in-part of U.S. Ser. No. 10/861,653, entitled "Method and Apparatus for Controlling Zone Players in a Multi-zone System", filed Jun. 5, 2004, now U.S. Pat. No. 7,571,014, which is a Continuation-in-part of U.S. Ser. No. 10/816,217, entitled "System And Method For Synchronizing Operations Among A Plurality Of Independently Clocked Digital Data Processing Devices", filed Apr. 1, 2004, now U.S. Pat. No. 8,234,395, which claims priority from Provisional Application Ser. No. 60/490,768

BACKGROUND OF THE INVENTION

Field of the Invention

The invention is generally related to the area of consumer electronics and human-computer interaction. In particular, the invention is related to user interfaces for controlling or manipulating a plurality of multimedia players in a multi-zone system.

An enduring passion for quality audio reproduction or system is continuing to drive demands from users. One of the demands includes an audio system in a house in which, for example, one could grill to classic rock on a patio while another one may cook up his/her own music selections in a kitchen. This is all at the same time while a teenager catches a ballgame in a family room, and another one blasts pop in a bedroom. And the best part of such audio system is that each family member does not need his or her own stereo system—one system gives everyone access to all the music sources.

Currently, one of the systems that can meet part of such demand is a conventional multi-zone audio system that usually includes a number of audio players. Each of the audio players has its own amplifier(s) and a set of speakers and typically installed in one place (e.g., a room). In order to play an audio source at one location, the audio source must be provided locally or from a centralized location. When the audio source is provided locally, the multi-zone audio system functions as a collection of many stereo systems, making source sharing difficult. When the audio source is provided centrally, the centralized location may include a juke box, many compact discs, an AM or FM radio, tapes, or others. To send an audio source to an audio player demanding such source, a cross-bar type of device is used to prevent the audio source from going to other audio players that may be playing other audio sources.

In order to achieve playing different audio sources in different audio players, the traditional multi-zone audio system is generally either hard-wired or controlled by a pre-configured and pre-programmed controller. While the pre-programmed configuration may be satisfactory in one situation, it may not be suitable for another situation. For example, a person would like to listen to broadcast news from his/her favorite radio station in a bedroom, a bathroom and a den while preparing to go to work in the morning. The same person may wish to listen in the den and the living room to music from a compact disc in the evening. In order to satisfy such requirements, two groups of audio players must be established. In the morning, the audio players in the bedroom, the bathroom and the den need to be grouped for the broadcast news. In the evening, the audio players in the den and the living room are grouped for the music. Over the weekend, the audio players in the den, the living room, and a kitchen are grouped for party music. Because the morning group, the evening group and the weekend group contain the den, it can be difficult for the traditional system to accommodate the requirement of dynamically managing the ad hoc creation and deletion of groups.

There is a need for dynamic control of the audio players as a group. With a minimum manipulation, the audio players may be readily grouped. There is further a need for user interfaces that may be readily utilized to group and control the audio players.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to controlling a plurality of multimedia players, or simply players, in groups. According to one aspect of the present invention, a mechanism is provided to allow a user to group some of the players according to a theme or scene, where each of the players is located in a zone. When the scene is activated, the players in the scene react in a synchronized manner. For example, the players in the scene are all caused to play an audio source or music in a playlist, wherein the audio source may be located anywhere on a network.

According to another aspect of the present invention, various user interfaces are provided to facilitate a user to create and manage a group and also create, edit or update a playlist for the group. Depending on implementation, the user interfaces may be displayed on a touch screen from which a user may act directly with the screen to group the players, the user interfaces may also be displayed on a display with other means (e.g., a stylus, a scroll wheel, or arrow buttons) to interact. In addition, the user displays are configured to show graphically how many players in a group versus other individual players.

According to still another aspect of the present invention, the scene may be activated at any time or a specific time. A user may activate the scene at any time so that only some selected zones in an entertainment system facilitate a playback of an audio source. When the scene is activated at a specific time, the scene may be used as an alarm or buzzer.

According to still another aspect of the present invention, a controlling device (also referred to herein as controller) is provided to facilitate a user to select any of the players in the system to form respective groups each of which is set up per a scene. Although various scenes may be saved in any of the members in a group, commands are preferably sent from the controller to the rest of the members when one of the scenes is executed. Depending on implementation, the commands include parameters pertaining to identifiers of the players, volumes settings, audio source and etc.

According to yet another aspect of the present invention, a configurable module is implemented in the controlling device that provides interactive graphic user interface for forming, managing and controlling groups in the system, de-grouping a group or adjusting audio volume of individual players or a group of players.

The present invention may be implemented in many forms including software, hardware or a combination of both. According to one embodiment, the present invention is directed to a method for groupings in a multi-zone media system, the method comprises providing a mechanism to allow a user to determine which players in the system to be associated with a theme representing a group; and configuring the theme with parameters pertaining to the players, wherein the theme is activated at anytime or a specific time so that the players react in a synchronized manner. The players in a scene are synchronized to play a multimedia file when the scene is activated.

According to another embodiment, the present invention is directed to a method for groupings in a multi-zone media system, the method comprises providing a user interface to allow a user to determine which players in the system to be associated with a theme representing a group, the user interface showing all available players at the time the user interface is created; allowing the user to visually select one of the players to be a first member of the theme; allowing the user to add more of the available players to the theme, if desired; and configuring the theme with parameters pertaining to the players. The theme may be activated at anytime or a specific time so that the players react in a synchronized manner.

According to still another embodiment, the present invention is directed to an entertainment system for grouping players, the system comprises: a plurality of players, each located in one zone; and a controller providing a mechanism to allow a user to select which of the players to be associated with a theme representing a group; and configure the theme with parameters pertaining to the selected players, wherein the theme is activated at anytime or a specific time so that the selected players react in a synchronized manner. As a result, the selected players are synchronized to play a multimedia that is in a digital format and retrieved from a source over a network.

One of the objects, features, and advantages of the present invention is to remotely control a plurality of multimedia players in a multi-zone system, playing and controlling the audio source synchronously if the players are grouped together, or playing and controlling the audio source individually if the players are disassociated with each other.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 3C shows an exemplary user interface (UI) of individual zones in a house;

DETAILED DESCRIPTION OF THE PREFERRED EMBODIMENTS

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
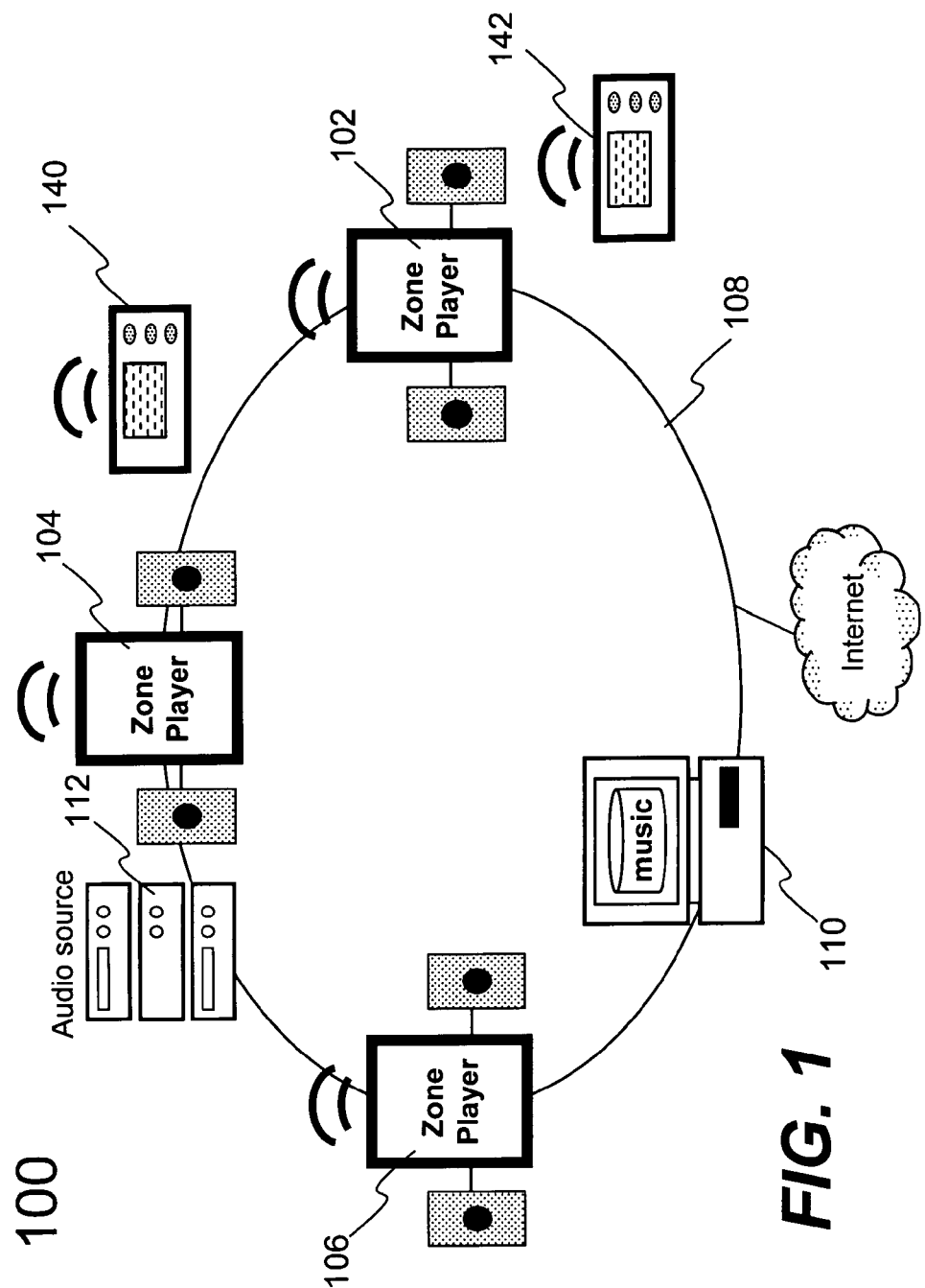
FIG. 1 shows an exemplary configuration in which the present invention may be practiced.

Referring now to the drawings, in which like numerals refer to like parts throughout the several views. FIG. 1 shows an exemplary configuration 100 in which the present invention may be practiced. The configuration may represent, but not be limited to, a part of a residential home, a business building or a complex with multiple zones. There are a number of multimedia players of which three examples 102, 104 and 106 are shown as audio devices. Each of the audio devices may be installed or provided in one particular area or zone and hence referred to as a zone player herein.

As used herein, unless explicitly stated otherwise, an audio source or audio sources are in digital format and can be transported or streamed over a data network. To facilitate the understanding of the present invention, it is assumed that the configuration 100 represents a home. Thus, the zone player 102 and 104 may be located in two of the bedrooms respectively while the zone player 106 may be installed in a living room. All of the zone players 102, 104 and 106 are coupled directly or indirectly to a data network 108. In addition, a computing device 110 is shown to be coupled on the network 108. In reality, any other devices such as a home gateway device, a storage device, or an MP3 player may be coupled to the network 108 as well.

The network 108 may be a wired network, a wireless network or a combination of both. In one example, all devices including the zone players 102, 104 and 106 are coupled to the network 108 by wireless means based on an industry standard such as IEEE 802.11. In yet another example, all devices including the zone players 102, 104 and 106 are part of a local area network that communicates with a wide area network (e.g., the Internet).

Many devices on the network 108 are configured to download and store audio sources. For example, the computing device 110 can download audio sources from the Internet and store the downloaded sources locally for sharing with other devices on the Internet or the network 108. The computing device 110 or any of the zone players can also be configured to receive streaming audio. Shown as a stereo system, the device 112 is configured to receive an analog audio source (e.g., from broadcasting) or retrieve a digital audio source (e.g., from a compact disk). The analog audio sources can be converted to digital audio sources. In accordance with the present invention, the audio source may be shared among the devices on the network 108.

Two or more zone players may be grouped together to form a new zone group. Any combinations of zone players and an existing zone group may be grouped together. In one instance, a new zone group is formed by adding one zone player to another zone player or an existing zone group.

Figure 2A:
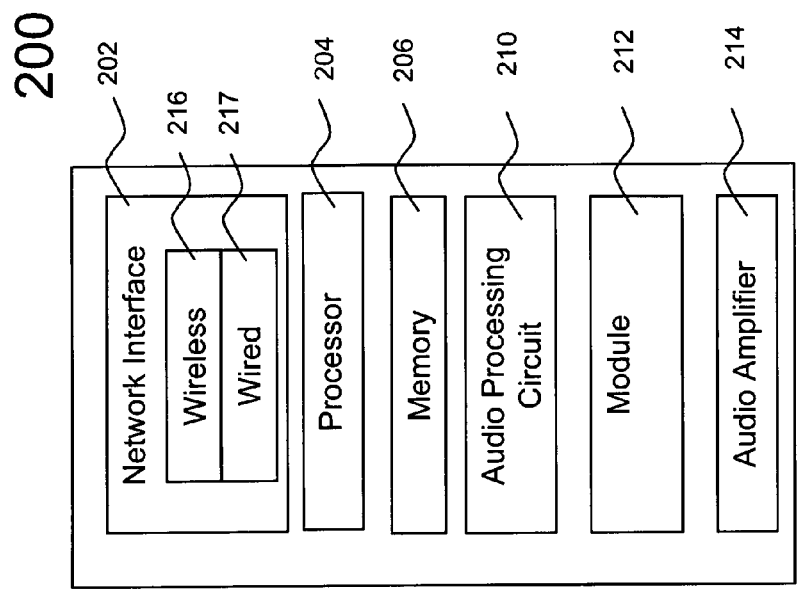
FIG. 2A shows an exemplary functional block diagram of a player in accordance with the present invention.

Referring now to FIG. 2A, there is shown an exemplary functional block diagram of a zone player 200 in accordance with the present invention. The zone player 200 includes a network interface 202, a processor 204, a memory 206, an audio processing circuit 210, a module 212, and optionally, an audio amplifier 214 that may be internal or external. The network interface 202 facilitates a data flow between a data network (i.e., the data network 108 of FIG. 1) and the zone player 200 and typically executes a special set of rules (i.e., a protocol) to send data back and forth. One of the common protocols used in the Internet is TCP/IP (Transmission Control Protocol/Internet Protocol). In general, a network interface manages the assembling of an audio source or file into smaller packets that are transmitted over the data network or reassembles received packets into the original source or file. In addition, the network interface 202 handles the address part of each packet so that it gets to the right destination or intercepts packets destined for the zone player 200.

The network interface 202 may include one or both of a wireless interface 216 and a wired interface 217. The wireless interface 216, also referred to as a RF interface, provides network interface functions by a wireless means for the zone player 200 to communicate with other devices in accordance with a communication protocol (such as the wireless standard IEEE 802.11a, 802.11b or 802.11g). The wired interface 217 provides network interface functions by a wired means (e.g., an Ethernet cable). In one embodiment, a zone player includes both of the interfaces 216 and 217, and other zone players include only a RF or wired interface. Thus these other zone players communicate with other devices on a network or retrieve audio sources via the zone player. The processor 204 is configured to control the operation of other parts in the zone player 200. The memory 206 may be loaded with one or more software modules that can be executed by the processor 204 to achieve desired tasks. According to one aspect of the present invention, a software module implementing one embodiment of the present invention is executed, the processor 204 operates in accordance with the software module in reference to a saved zone group configuration characterizing a zone group created by a user, the zone player 200 is caused to retrieve an audio source from another zone player or a device on the network.

According to one embodiment of the present invention, the memory 206 is used to save one or more saved zone configuration files that may be retrieved for modification at any time. Typically, a saved zone group configuration file is transmitted to a controller (e.g., the controlling device 140 or 142 of FIG. 1, a computer, a portable device, or a TV) when a user operates the controlling device. The zone group configuration provides an interactive user interface so that various manipulations or control of the zone players may be performed.

The audio processing circuit 210 resembles most of the circuitry in an audio playback device and includes one or more digital-to-analog converters (DAC), an audio preprocessing part, an audio enhancement part or a digital signal processor and others. In operation, when an audio source is retrieved via the network interface 202, the audio source is processed in the audio processing circuit 210 to produce analog audio signals. The processed analog audio signals are then provided to the audio amplifier 214 for playback on speakers. In addition, the audio processing circuit 210 may include necessary circuitry to process analog signals as inputs to produce digital signals for sharing with other devices on a network.

Depending on an exact implementation, the module 212 may be implemented as a combination of hardware and software. In one embodiment, the module 212 is used to save a scene. The audio amplifier 214 is typically an analog circuit that powers the provided analog audio signals to drive one or more speakers.

Figure 2B:
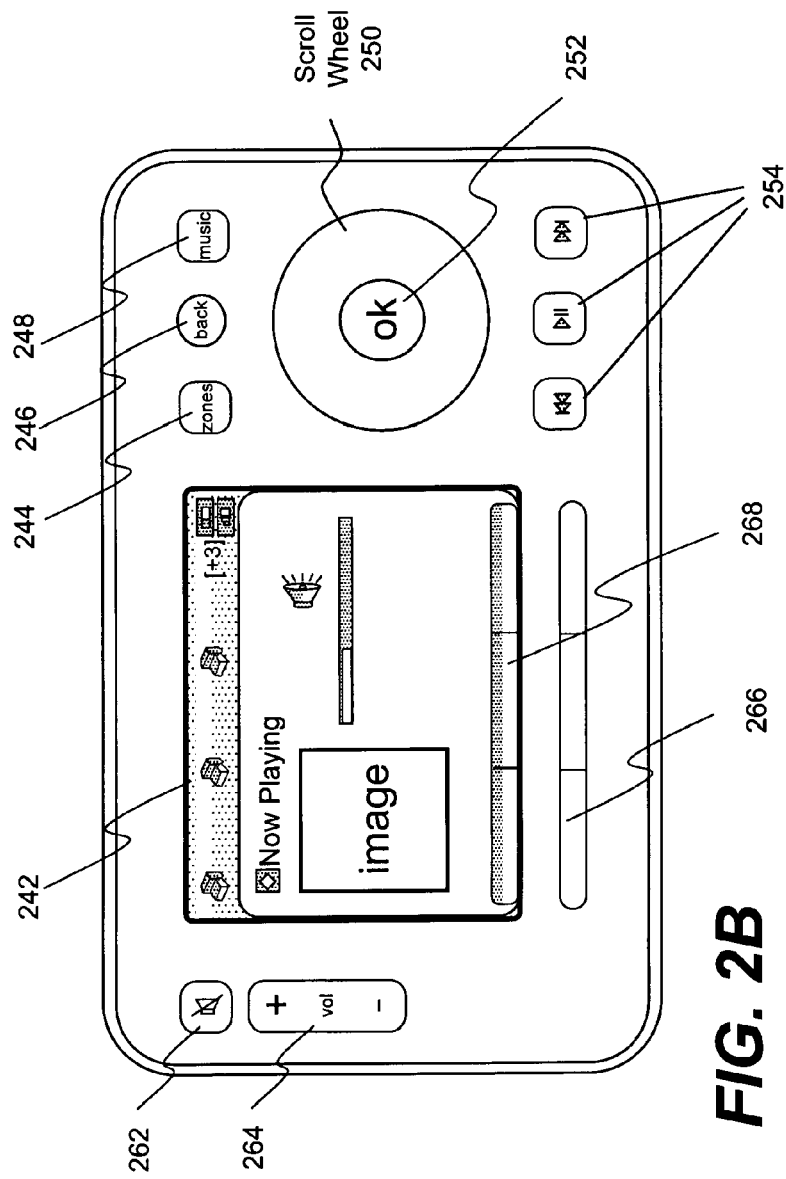
FIG. 2B shows an example of a controller that may be used to remotely control one of more players of FIG. 2A.

Referring now to FIG. 2B, there is shown an exemplary controller 240, which may correspond to the controlling device 140 or 142 of FIG. 1. The controller 240 may be used to facilitate the control of multi-media applications, automation and others in a complex. In particular, the controller 240 is configured to facilitate a selection of a plurality of audio sources available on the network, controlling operations of one or more zone players (e.g., the zone player 200) through a RF interface corresponding to the RF interface 216 of FIG. 2A. According to one embodiment, the wireless means is based on an industry standard (e.g., infrared, radio, wireless standard IEEE 802.11a, 802.11b or 802.11g). When a particular audio source is being played in the zone player 200, a picture, if there is any, associated with the audio source may be transmitted from the zone player 200 to the controller 240 for display. In one embodiment, the controller 240 is used to synchronize more than one zone players by grouping the zone players. In another embodiment, the controller 240 is used to control the volume of each of the zone players in a zone group individually or together.

The user interface for the controller 240 includes a screen 242 (e.g., a LCD screen) and a set of functional buttons as follows: a "zones" button 244, a "back" button 246, a "music" button 248, a scroll wheel 250, "ok" button 252, a set of transport control buttons 254, a mute button 262, a volume up/down button 264, a set of soft buttons 266 corresponding to the labels 268 displayed on the screen 242.

The screen 242 displays various screen menus in response to a user's selection. In one embodiment, the "zones" button 244 activates a zone management screen or "Zone Menu", which is described in more details below. The "back" button 246 may lead to different actions depending on the current screen. In one embodiment, the "back" button triggers the current screen display to go back to a previous one. In another embodiment, the "back" button negates the user's erroneous selection. The "music" button 248 activates a music menu, which allows the selection of an audio source (e.g., a song) to be added to a zone player's music queue for playback.

The scroll wheel 250 is used for selecting an item within a list, whenever a list is presented on the screen 242. When the items in the list are too many to be accommodated in one screen display, a scroll indicator such as a scroll bar or a scroll arrow is displayed beside the list. When the scroll indicator is displayed, a user may rotate the scroll wheel 250 to either choose a displayed item or display a hidden item in the list. The "ok" button 252 is used to confirm the user selection on the screen 242.

There are three transport buttons 254, which are used to control the effect of the currently playing song. For example, the functions of the transport buttons may include play/pause and forward/rewind a song, move forward to a next song track, or move backward to a previous track. According to one embodiment, pressing one of the volume control buttons such as the mute button 262 or the volume up/down button 264 activates a volume panel. In addition, there are three soft buttons 266 that can be activated in accordance with the labels 268 on the screen 242. It can be understood that, in a multi-zone system, there may be multiple audio sources being played respectively in more than one zone players. The music transport functions described herein shall apply selectively to one of the sources when a corresponding one of the zone players or zone groups is selected.

Figure 2C:
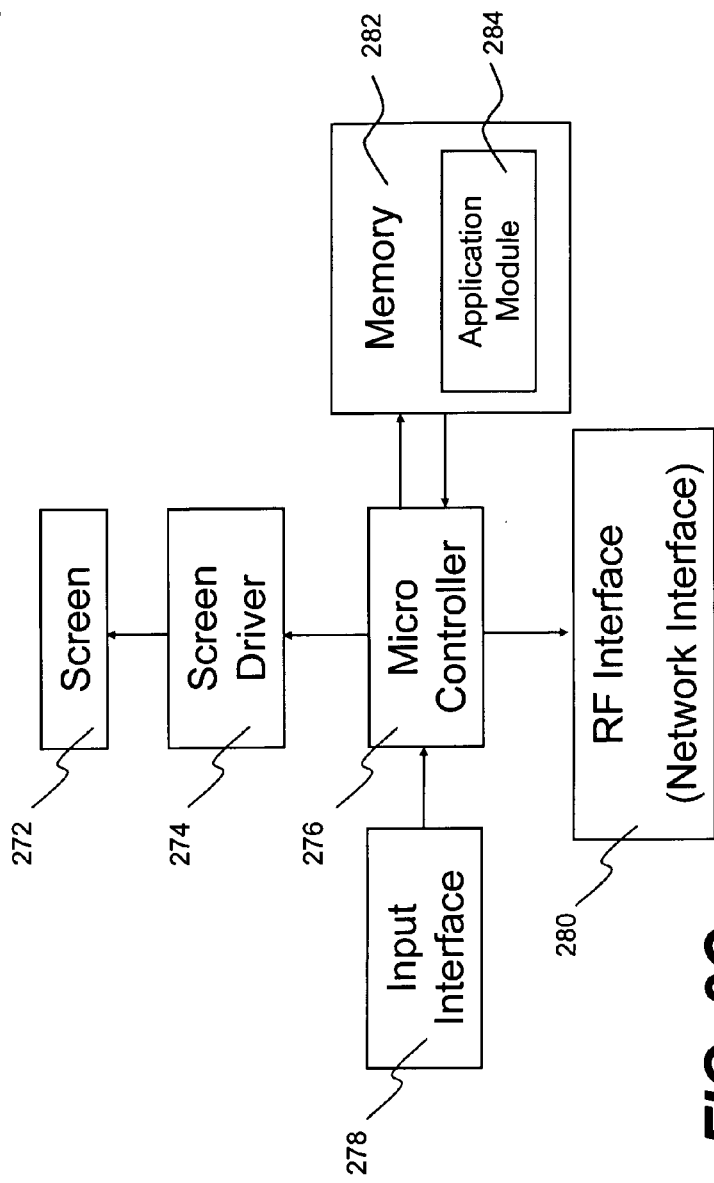
FIG. 2C shows an exemplary internal functional block diagram of a controller in accordance with one embodiment of the present invention.

FIG. 2C illustrates an internal functional block diagram of an exemplary controller 270, which may correspond to the controller 240 of FIG. 2B. The screen 272 on the controller 270 may be a LCD screen. The screen 272 communicates with and is commanded by a screen driver 274 that is controlled by a microcontroller (e.g., a processor) 276. The memory 282 may be loaded with one or more application modules 284 that can be executed by the microcontroller 276 with or without a user input via the user interface 278 to achieve desired tasks. In one embodiment, an application module is configured to facilitate grouping a number of selected zone players into a zone group and synchronizing the zone players for one audio source. In another embodiment, an application module is configured to control together the audio volumes of the zone players in a zone group. In operation, when the microcontroller 276 executes one of the application modules 284, the screen driver 274 generates control signals to drive the screen 272 to display an application specific user interface accordingly, more of which will be described below.

The controller 270 includes a network interface 280 referred to as a RF interface 280 that facilitates wireless communication with a zone player via a corresponding RF interface thereof. In one embodiment, the commands such as volume control and audio playback synchronization are sent via the RF interfaces. In another embodiment, a saved zone group configuration is transmitted between a zone player and a controller via the RF interfaces. The controller 270 may control one or more zone players, such as 102, 104 and 106 of FIG. 1. Nevertheless, there may be more than one controllers, each preferably in a zone (e.g., a room) and configured to control any one and all of the zone players.

In one embodiment, a user creates a zone group including at least two zone players from the controller 240 that sends signals or data to one of the zone players. As all the zone players are coupled on a network, the received signals in one zone player can cause other zone players in the group to be synchronized so that all the zone players in the group playback an identical audio source or a list of identical audio sources in a timely synchronized manner. Similarly, when a user increases the audio volume of the group from the controller, the signals or data of increasing the audio volume for the group are sent to one of the zone players and causes other zone players in the group to be increased together in volume and in scale.

According to one implementation, an application module is loaded in memory 282 for zone group management. When a predetermined key (e.g. the "zones" button 244) is activated on the controller 240, the application module is executed in the microcontroller 276. The input interface 278 coupled to and controlled by the microcontroller 276 receives inputs from a user. A "Zone Menu" is then displayed on the screen 272. The user may start grouping zone players into a zone group by activating a "Link Zones" or "Add Zone" soft button, or de-grouping a zone group by activating an "Unlink Zones" or "Drop Zone" button. The detail of the zone group manipulation will be further discussed below.

As described above, the input interface 278 includes a number of function buttons as well as a screen graphical user interface. It should be pointed out that the controller 240 in FIG. 2B is not the only controlling device that may practice the present invention. Other devices that provide the equivalent control functions (e.g., a computing device, a hand-held device) may also be configured to practice the present invention. In the above description, unless otherwise specifically described, it is clear that keys or buttons are generally referred to as either the physical buttons or soft buttons, enabling a user to enter a command or data.

One mechanism for 'joining' zone players together for music playback is to link a number of zone players together to form a group. To link a number of zone players together, a user may manually link each zone player or room one after the other. For example, there is a multi-zone system that includes the following zones.

Bathroom
Bedroom
Den
Dining Room
Family Room
Foyer

If the user wishes to link 5 of the 6 zone players using the current mechanism, he/she must start with a single zone and then manually link each zone to that zone. This mechanism may be sometimes quite time consuming. According to one embodiment, a set of zones can be dynamically linked together using one command. Using what is referred to herein as a theme or a zone scene, zones can be configured in a particular scene (e.g., morning, afternoon, or garden), where a predefined zone grouping and setting of attributes for the grouping are automatically effectuated.

Figure 3A:
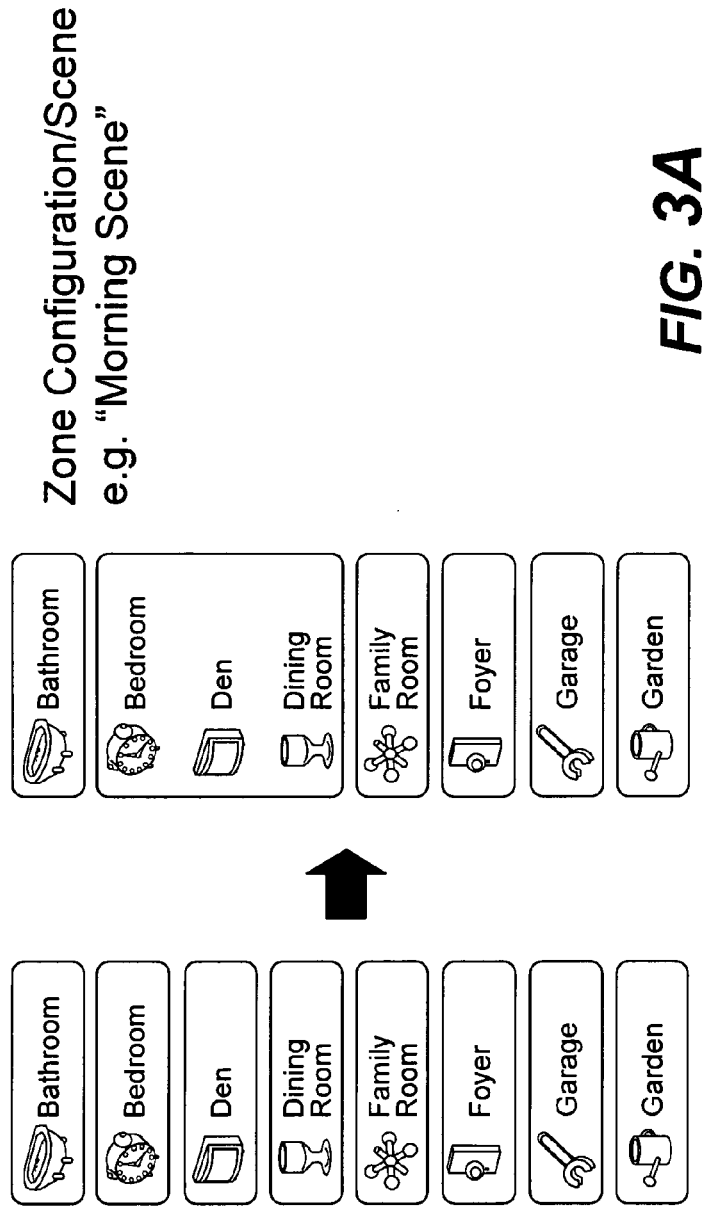
FIG. 3A provides an illustration of one zone scene, where the left column shows the starting zone grouping—all zones are separate, the column on the right shows the effects of grouping the zones to make a group of 3 zones named after "Morning"

For instance, a "Morning" zone scene/configuration command would link the Bedroom, Den and Dining Room together in one action. Without this single command, the user would need to manually and individually link each zone. FIG. 3A provides an illustration of one zone scene, where the left column shows the starting zone grouping—all zones are separate, the column on the right shows the effects of grouping the zones to make a group of 3 zones named after "Morning".

Expanding this idea further, a Zone Scene can be set to create multiple sets of linked zones. For example, a scene creates 3 separate groups of zones, the downstairs zones would be linked together, the upstairs zones would be linked together in their own group, and the outside zones (in this case the patio) would move into a group of its own.

Figure 3B:
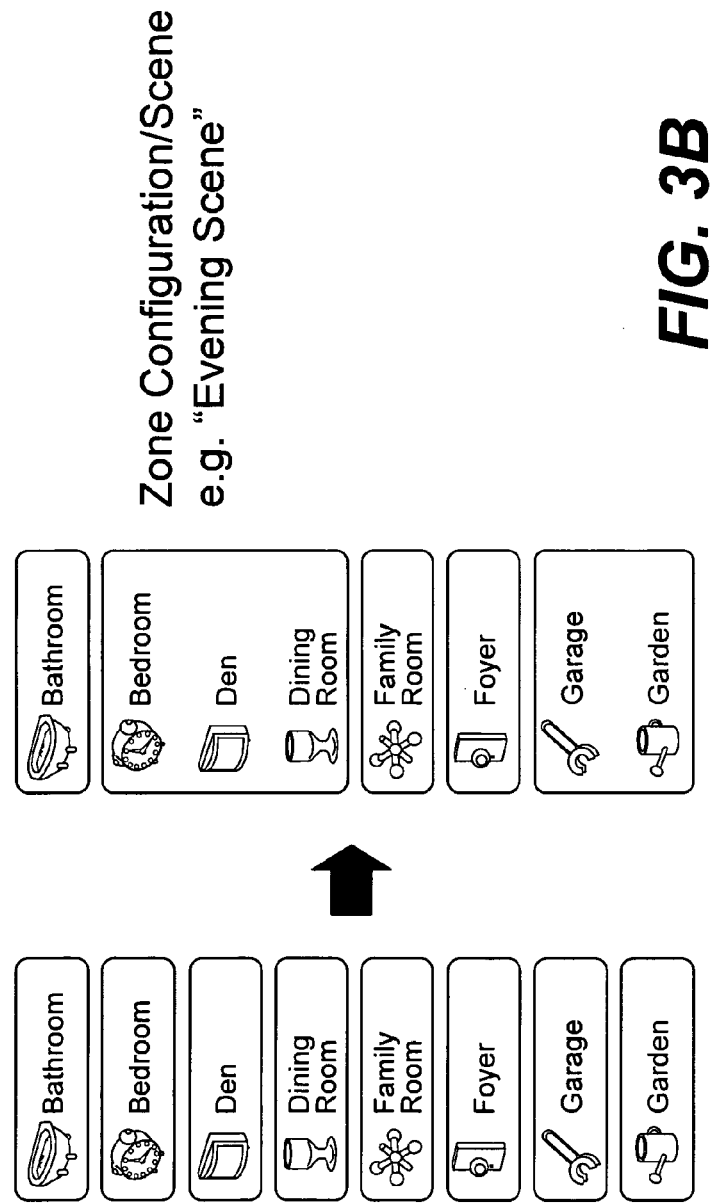
FIG. 3B shows that a user defines multiple groups to be gathered at the same time.

In one embodiment as shown in FIG. 3B, a user defines multiple groups to be gathered at the same time. For example: an "Evening Scene" is desired to link the following zones:

Group 1
   Bedroom
   Den
   Dining Room
Group 2
   Garage
   Garden where Bathroom, Family Room and Foyer should be separated from any group if they were part of a group before the Zone Scene was invoked.

One of the important features, benefits and objects in the present invention is that that zones do not need to be separated before a zone scene is invoked. In one embodiment, a command is provided and links all zones in one step, if invoked. The command is in a form of a zone scene. After linking the appropriate zones, a zone scene command could apply the following attributes:

Set volumes levels in each zones (each zone can have a different volume)
Mute/Unmute zones.
Select and play specific music in the zones.
Set the play mode of the music (Shuffle, Repeat, Shuffle-repeat)
Set the music playback equalization of each zone (e.g., bass treble).

A further extension of this embodiment is to trigger a zone scene command as an alarm clock function. For instance the zone scene is set to apply at 8:00 am. It could link appropriate zones automatically, set specific music to play and then stop the music after a defined duration. Although a single zone may be assigned to an alarm, a scene set as an alarm clock provides a synchronized alarm, allowing any zones linked in the scene to play a predefined audio (e.g., a favorable song, a predefined playlist) at a specific time or for a specific duration. If, for any reason, the scheduled music failed to be played (e.g., an empty playlist, no connection to a share, failed UPnP, no Internet connection for an Internet Radio station), a backup buzzer will sound. This buzzer will be a sound file that is stored in a zone player.

Figure 3D:
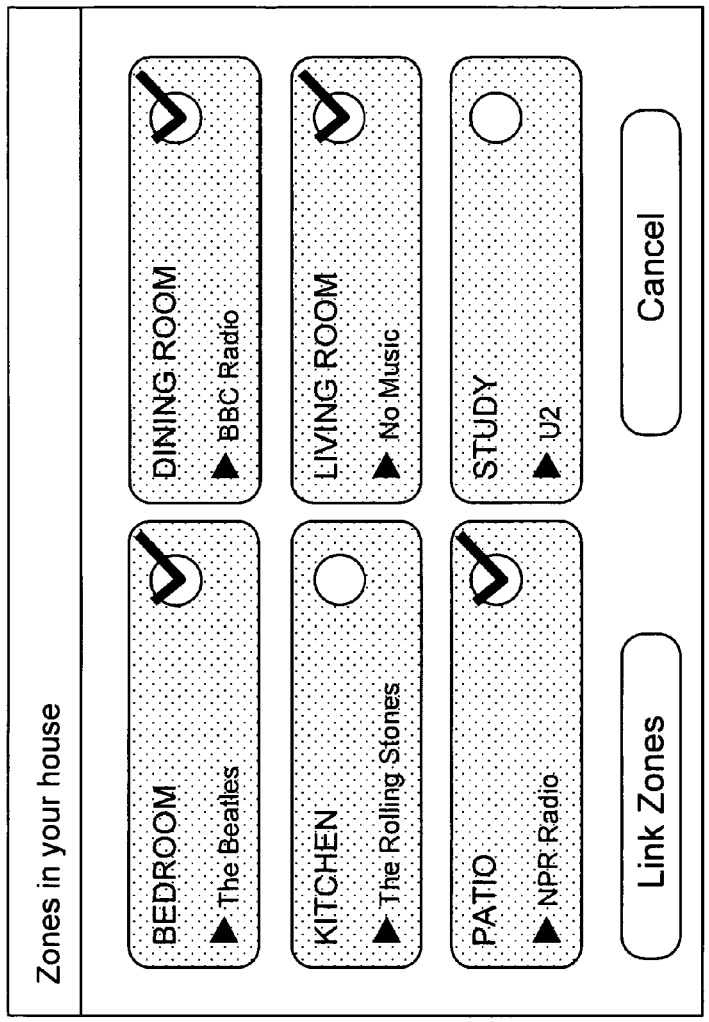
FIG. 3D shows a user interface as a result of the use activating "link zones" of FIG. 3C.

FIG. 3C shows an exemplary user interface (UI) 330 to show all available individual zones in a house. Each zone player can play a type of media (such as music, photographs and video) independently. Each zone player in the UI may be highlighted on the screen using either a touch screen or an input device such as a stylus, a scroll wheel, or arrow buttons. If a user wishes to link players in some rooms together to form a group so that players in these rooms are playing the same media in a synchronized fashion, the user may activate the grouping function by activating "link zones" 332 that leads to a user interface 340 as shown in FIG. 3D.

The UI 340 shows that the zone players available for grouping are selectable. In one embodiment, the UI 340 is displayed (e.g., a touch screen) to allow the user to choose what zone players to be included in a group named after "Bedroom" so that they are all playing the same song "The Beatles". It should be noted that the user may have an option to name the scene, for example, "afternoon", or "light music". In the example shown in FIGS. 3C and 3D, the user selects the Bedroom zone and then the "Link Zones" button 332, as a result, the default name for the scene being created is named after "Bedroom". As shown FIG. 3D, a zone player may be selected or highlighted by "checking" it into the group. In another embodiment, the selection action could also be achieved through pressing the "+−" icon next to each zone.

Figure 3E:
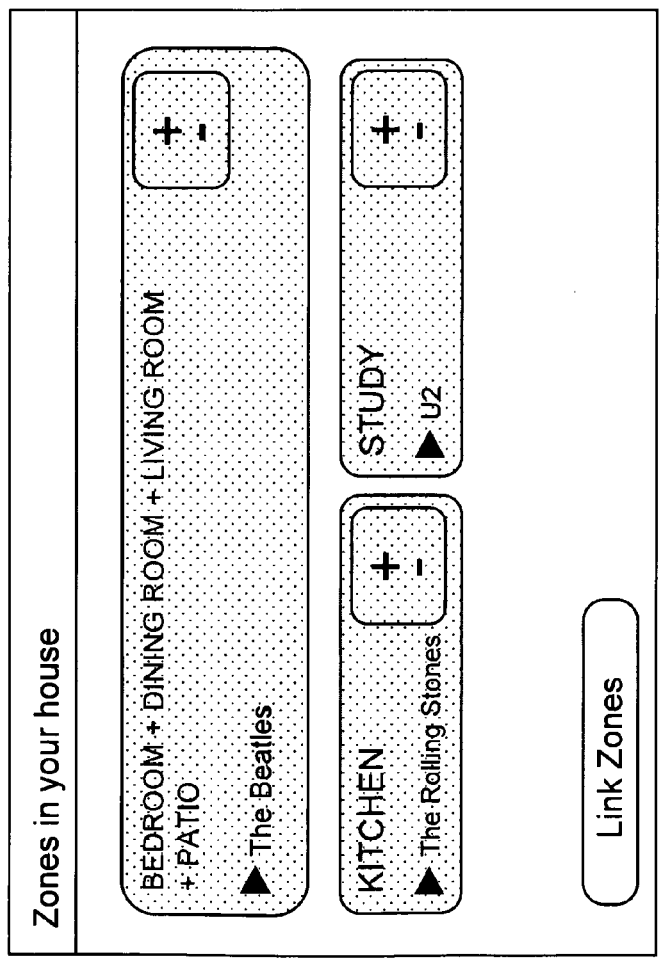
FIG. 3E shows a user interface after the user has selected some of the available zone players into the scene.

FIG. 3E shows a user interface 350 after the user has selected some of the available zone players into the scene. The display 350 is so displayed that a user can easily tell a group of linked players from the isolated players. According to one embodiment, a display may be provided to visually tell a user what have been grouped and what are not grouped. The display may even show various groups by size to indicate a number of zone players in each of the groups, for example, the larger a group appears, the more zone players there are in the group.

In general, all players in a group are caused to play the media being played in the first member used to form the group. In the case of FIG. 3E, the zone player in the bedroom is used to initiate the group or the first one in the group. At the time of forming the group, the zone player in the bedroom is playing "the Beatles", as soon as a second zone player joins the group, the second zone player starts to be synchronized with the one already in the group and thus to play "the Beatles" in this case. As will be described below, the user now can switch the group of players to any other type of media or a different piece of music and all of the zone players in the group will play the selected media at the same time.

Figure 4:
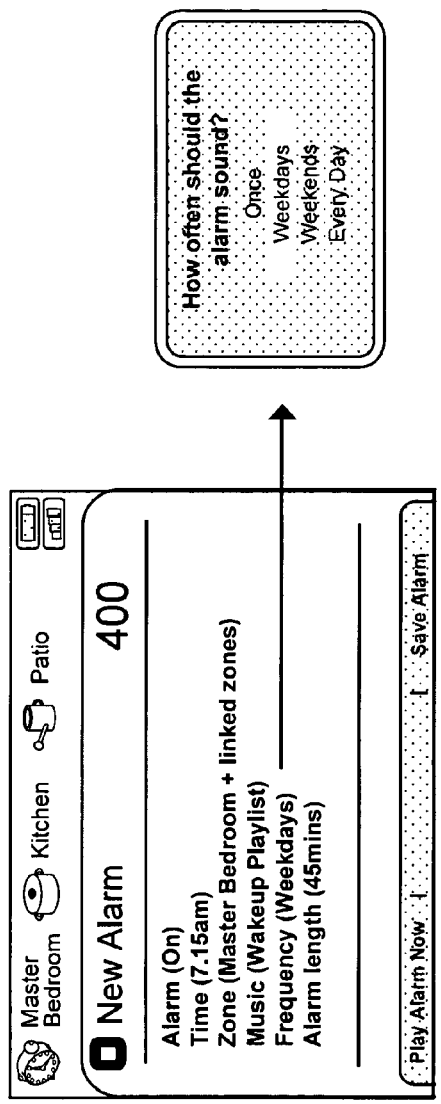
FIG. 4 shows an exemplary user interface that may be displayed on a controller or a computer of FIG. 1.

FIG. 4 shows an exemplary user interface 400 that may be displayed on a controller 142 or a computer 110 of FIG. 1. The interface 400 shows a list of items that may be set up by a user to cause a scene to function at a specific time. In the embodiment shown in FIG. 4, the list of items includes "Alarm", "Time", "Zone", "Music", "Frequency" and "Alarm length". "Alarm" can be set on or off. When "Alarm" is set on, "Time" is a specific time to set off the alarm. "Zone" shows which zone players are being set to play a specified audio at the specific time. "Music" shows what to be played when the specific time arrives. "Frequency" allows the user to define a frequency of the alarm. "Alarm length" defines how long the audio is to be played. It should be noted that the user interface 400 is provided herein to show some of the functions associated with setting up an alarm. Depending on an exact implementation, other functions, such as time zone, daylight savings, time synchronization, and time/date format for display may also be provided without departing from the present invention.

According to one embodiment, each zone player in a scene may be set up for different alarms. For example, a "Morning" scene includes three zone players, each in a bedroom, a den, and a dining room. After selecting the scene, the user may set up an alarm for the scene as whole. As a result, each of the zone players will be activated at a specific time.

Figure 5A:
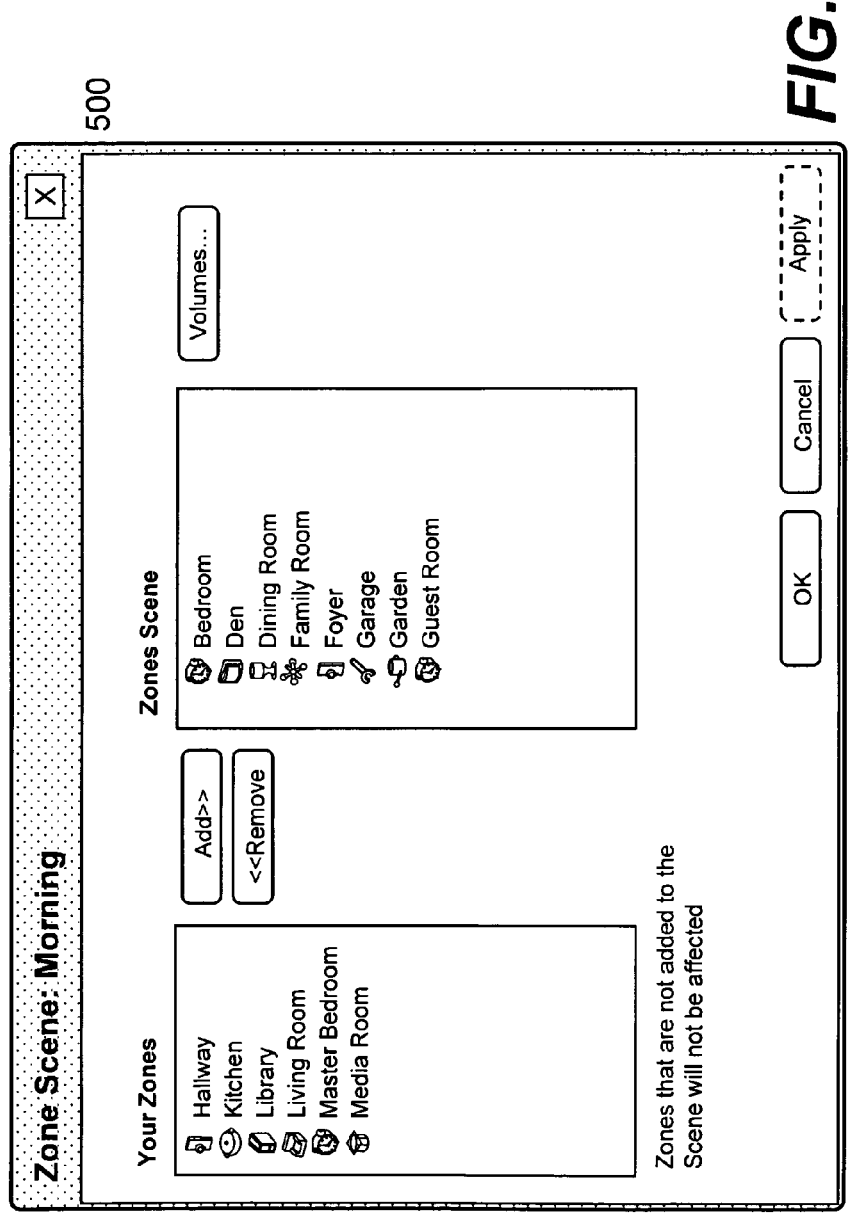
FIG. 5A shows another user interface to allow a user to form a scene.

FIG. 5A shows a user interface 500 to allow a user to form a scene. The panel on the left shows the available zones in a household. The panel on the right shows the zones that have been selected and be grouped as part of this scene. Depending on an exact implementation of a user interface, Add/Remove buttons may be provided to move zones between the panels, or zones may be dragged along between panels.

Figure 5B:
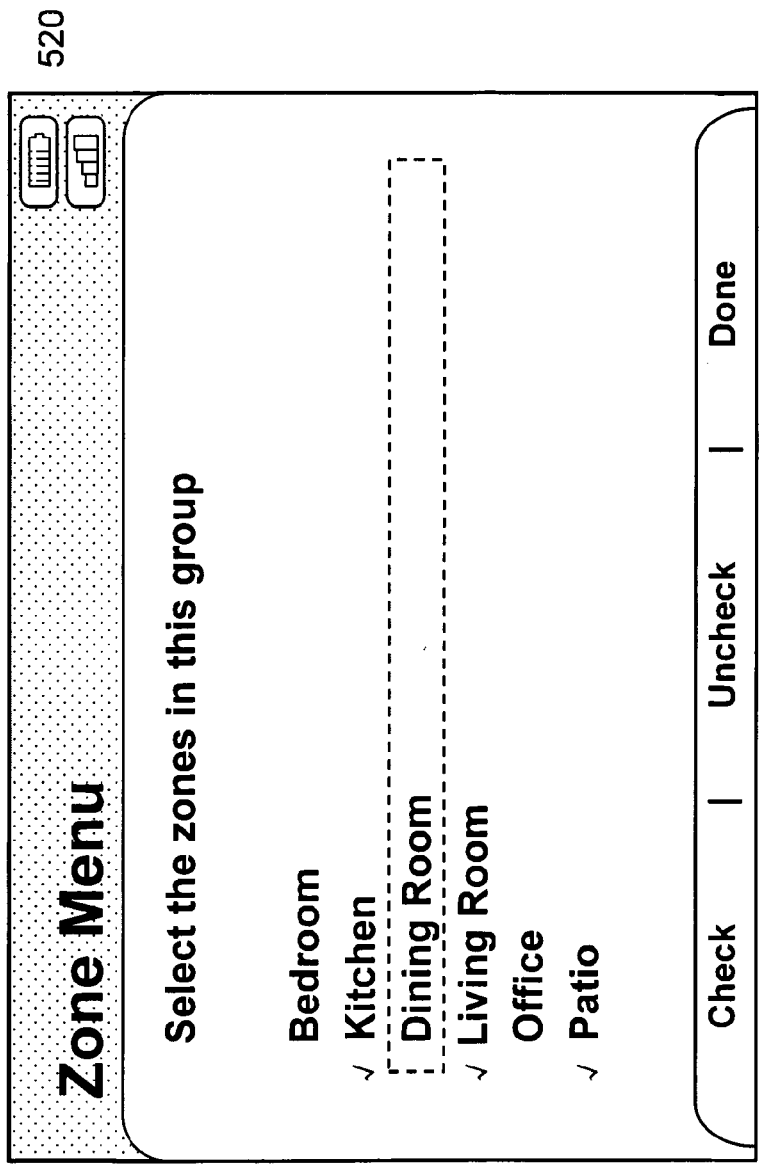
FIG. 5B shows still another user interface to allow a user to form a scene.

FIG. 5B shows another user interface 520 to allow a user to form a scene. The user interface 520 that may be displayed on a controller or a computing device, lists available zones in a system. A checkbox is provided next to each of the zones so that a user may check in the zones to be associated with the scene.

Figure 5C:
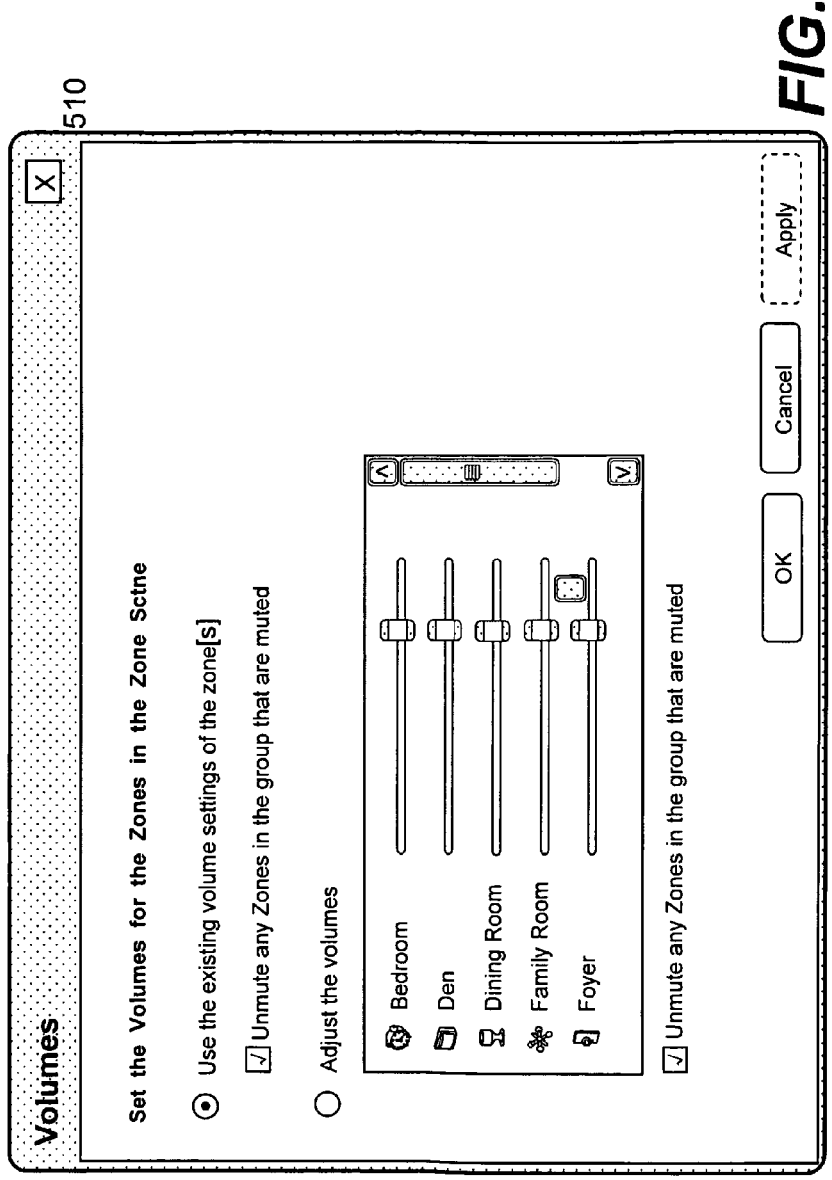
FIG. 5C shows a user interface to allow a user to adjust a volume level of the zone players in a zone scene individually or collectively.

FIG. 5C shows a user interface 510 to allow a user to adjust a volume level of the zone players in a zone scene individually or collectively. As shown in the user interface 510, the 'Volumes . . . ' button (shown as sliders, other forms are possible) allows the user to affect the volumes of the associated zone players when a zone scene is invoked. In one embodiment, the zone players can be set to retain whatever volume that they currently have when the scene is invoked. Additionally the user can decide if the volumes should be unmuted or muted when the scene is invoked.

Figure 6:
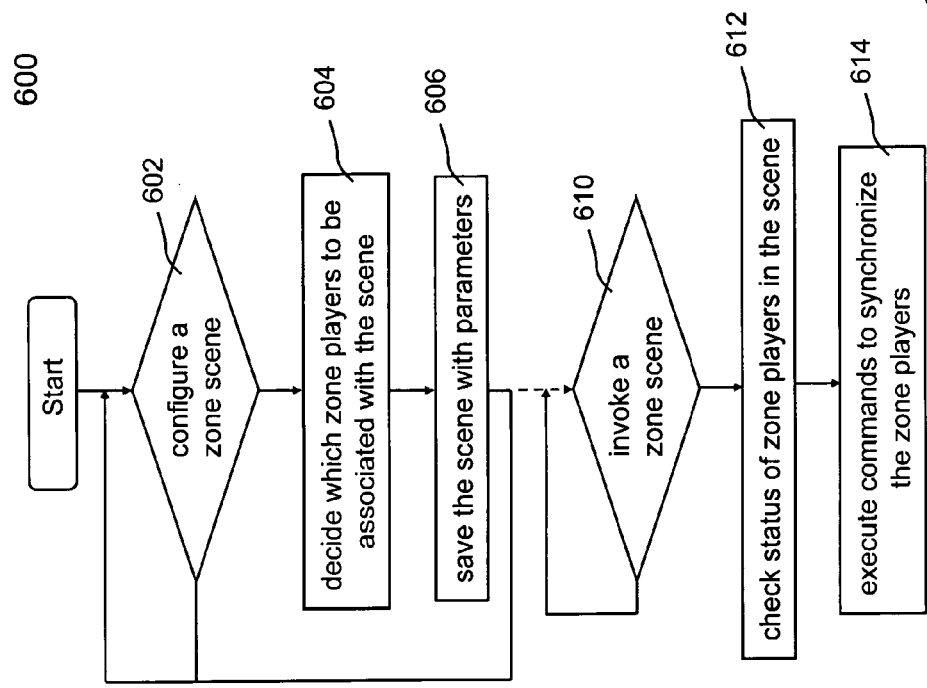
FIG. 6 shows a flowchart or process of providing a player theme or a zone scene for a plurality of players, where one or more of the players are placed in a zone.

FIG. 6 shows a flowchart or process 600 of providing a player theme or a zone scene for a plurality of players, where one or more of the players are placed in a zone. The process 600 is presented in accordance with one embodiment of the present invention and may be implemented in a module to be located in the memory 282 of FIG. 2C.

The process 600 is initiated only when a user decides to proceed with a zone scene at 602. The process 600 then moves to 604 where it allows a user to decide which zone players to be associated with the scene. For example, there are ten players in a household, and the scene is named after "Morning". The user may be given an interface to select four of the ten players to be associated with the scene. At 606, the scene is saved. The scene may be saved in any one of the members in the scene. In the example of FIG. 1, the scene is saved in one of the zone players and displayed on the controller 142. In operation, a set of data pertaining to the scene includes a plurality of parameters. In one embodiment, the parameters include, but may not be limited to, identifiers (e.g., IP address) of the associated players and a playlist. The parameters may also include volume/tone settings for the associated players in the scene. The user may go back to 602 to configure another scene if desired.

Given a saved scene, a user may activate the scene at any time or set up a timer to activate the scene at 610. The process 600 can continue when a saved scene is activated at 610. At 612, upon the activation of a saved scene, the process 600 checks the status of the players associated with the scene. The status of the players means that each of the players shall be in condition to react in a synchronized manner. In one embodiment, the interconnections of the players are checked to make sure that the players communicate among themselves and/or with a controller if there is such a controller in the scene.

It is assumed that all players associated with the scene are in good condition. At 614, commands are executed with the parameters (e.g., pertaining to a playlist and volumes). In one embodiment, data including the parameters is transported from a member (e.g., a controller) to other members in the scene so that the players are caused to synchronize an operation configured in the scene. The operation may cause all players to play back a song in identical or different volumes or to play back a pre-stored file.

One of the features, benefits and advantages in the present invention is to allow sets of related devices (controllers and operating components) to exist as a group without interfering with other components that are potentially visible on the same wired or wireless network. Each of the sets is configured to a theme or a scene.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

We claim:

1. A multimedia controller including a processor, the controller configured to:
   provide a user interface for a player group, wherein the player group includes a plurality of players in a local area network, and wherein each player is an independent playback device configured to playback a multimedia output from a multimedia source;
   accept via the user interface an input to facilitate formation of the player group, wherein the input to facilitate formation of the player group indicates that at least two of the plurality of players in the local area network are to be included in the player group;
   for each of the plurality of players within the player group, accept via the user interface an input to adjust a volume associated with the player, wherein the input to adjust the volume associated with the player causes the corresponding independent playback device to adjust its volume; and
   accept via the user interface an input to adjust a volume associated with the player group, wherein the input to adjust the volume associated with the group causes the corresponding independent playback devices in the player group to adjust their volumes.

2. The multimedia controller of claim 1, wherein the controller is further configured to accept via the user interface an input to remove one of the plurality of players from the player group.

3. The multimedia controller of claim 1, wherein the controller is further configured to accept via the user interface an input to mute the volume of the player group, wherein the input to mute the player group causes the players within the player group to mute their volume.

4. The multimedia controller of claim 3, wherein the input to mute the player group causes the players in the player group to adjust their volumes further comprises:
   the controller sending an instruction to one of the players in the player group, the instruction indicating that the volumes of each of the players in the player group should be adjusted in scale.

5. The multimedia controller of claim 1, wherein the controller is further configured to accept via the user interface an input to name the player group.

6. The multimedia controller of claim 1, wherein the controller is further configured to accept via the user interface an input to mute the volume of one of the players within the player group, wherein the input to mute one of the players within the player group causes the player within the player group to mute its volume.

7. The multimedia controller of claim 1, wherein the controller is further configured to save a configuration associated with the player group, wherein the configuration includes one or more of the following parameters: a) a volume level for each player in the player group, b) a mute or unmute setting for each player in the player group, and d) an equalization setting for each player in the player group.

8. A non-transitory computer readable storage medium including a set of instructions for execution by a processor, the set of instructions, when implemented, implement a controller configured to:
   provide a user interface for a player group, wherein the player group includes a plurality of players in a local area network, and wherein each player is an independent playback device configured to playback a multimedia output from a multimedia source;

accept via the user interface an input to facilitate formation of the player group, wherein the input to facilitate formation of the player group indicates that at least two of the plurality of players in the local area network are to be included in the player group;

for each of the plurality of players within the player group, accept via the user interface an input to adjust a volume associated with the player, wherein the input to adjust the volume associated with the player causes the corresponding independent playback device to adjust its volume; and accept via the user interface an input to adjust a volume associated with the player group, wherein the input to adjust the volume associated with the group causes the corresponding independent playback devices in the player group to adjust their volumes.

9. The computer readable medium of claim 8, wherein the controller is further configured to accept via the user interface an input to remove one of the plurality of players from the player group.

10. The computer readable medium of claim 8, wherein the controller is further configured to accept via the user interface an input to mute the volume of the player group, wherein the input to mute the player group causes the players within the player group to mute their volume.

11. The computer readable medium of claim 10, wherein the input to mute the player group causes the players in the player group to adjust their volumes comprises:

the controller sending an instruction to one of the players in the player group, the instruction indicating that the volumes of each of the players in the player group should be adjusted in scale.

12. The computer readable medium of claim 8, wherein the controller is further configured to accept via the user interface an input to name the player group.

13. The computer readable medium of claim 8, wherein the controller is further configured to accept via the user interface an input to mute the volume of one of the players within the player group, wherein the input to mute one of the players within the player group causes the player within the player group to mute its volume.

14. The computer readable medium of claim 8, wherein the controller is further configured to save a configuration associated with the player group, wherein the configuration includes one or more of the following parameters: a) a volume level for each player in the player group, b) a mute or unmute setting for each player in the player group, and d) an equalization setting for each player in the player group.

15. A method comprising:

displaying a user interface for a player group, wherein the player group includes a plurality of players in a local area network, and wherein each player is an independent playback device configured to playback a multimedia output from a multimedia source;

receiving via the user interface an input to facilitate formation of the player group, wherein the input to facilitate formation of the player group indicates that at least two of the plurality of players in the local area network are to be included in the player group;

receiving via the user interface an input to adjust a volume associated with one of the players within the player group, and responsively instructing the corresponding independent playback device within the player group to adjust its volume; and receiving via the user interface an input to adjust a volume associated with the player group, and responsively instructing the corresponding independent playback devices in the player group to adjust their volumes.

16. The method of claim 15, further comprising:

receiving via the user interface an input to remove one of the plurality of players from the player group, and responsively removing the one of the plurality of players from the player group.

17. The method of claim 15, further comprising:

receiving via the user interface an input to mute the volume of the player group, and responsively instructing the players within the player group to mute their volume.

18. The method of claim 15, wherein instructing the players in the player group to adjust their volumes:

sending an instruction to one of the players in the player group, the instruction indicating that the volumes of each of the players in the player group should be adjusted in scale.

19. The method of claim 15, further comprising receiving an input to name the player group, and responsively assigning the name to the player group.

20. The method of claim 15, further comprising receiving via the user interface an input to mute the volume of one of the players within the player group, and responsively instructing the player within the player group to mute its volume.

* * * * *

(12) EX PARTE REEXAMINATION CERTIFICATE (10755th)
United States Patent
Lambourne et al.

(10) Number: US 8,588,949 C1
(45) Certificate Issued: Nov. 5, 2015

(54) METHOD AND APPARATUS FOR ADJUSTING VOLUME LEVELS IN A MULTI-ZONE SYSTEM

(75) Inventors: Robert A. Lambourne, Santa Barbara, CA (US); Nicholas A. J. Millington, Santa Barbara, CA (US)

(73) Assignee: SONOS, INC., Santa Barbara, CA (US)

Reexamination Request:
No. 90/013,423, Jan. 5, 2015

Reexamination Certificate for:
Patent No.: 8,588,949
Issued: Nov. 19, 2013
Appl. No.: 13/619,237
Filed: Sep. 14, 2012

Related U.S. Application Data

(63) Continuation of application No. 12/035,112, filed on Feb. 21, 2008, now Pat. No. 8,290,603, which is a continuation-in-part of application No. 10/861,653, filed on Jun. 5, 2004, now Pat. No. 7,571,014, which is a continuation-in-part of application No. 10/816,217, filed on Apr. 1, 2004, now Pat. No. 8,234,395.

(60) Provisional application No. 60/490,768, filed on Jul. 28, 2003.

(51) Int. Cl.
*G06F 17/00* (2006.01)
*G11B 27/00* (2006.01)
*G06F 17/30* (2006.01)

(52) U.S. Cl.
CPC .......... *G06F 17/30283* (2013.01); *G11B 27/00* (2013.01)

(58) Field of Classification Search
CPC ................... G06F 17/30283; G06F 17/30265; G06F 17/30182; G06F 17/30056; G11B 27/00; G11B 2020/10574
See application file for complete search history.

(56) References Cited

To view the complete listing of prior art documents cited during the proceeding for Reexamination Control Number 90/013,423, please refer to the USPTO's public Patent Application Information Retrieval (PAIR) system under the Display References tab.

*Primary Examiner* — Sam Rimell

(57) ABSTRACT

A multimedia controller including a processor, the controller configured to: provide a user interface for a player group, wherein the player group includes a plurality of players in a local area network, and wherein each player is configured to playback a multimedia output from a multimedia source; accept an input to facilitate formation of the player group, indicating that at least two of the players in the local area network are to be included in the player group; for each of the plurality of players within the player group, accept an input to adjust a volume associated with the player, that causes the player to adjust its volume; and accept an input to adjust a volume associated with the player group, wherein the input to adjust the volume associated with the group causes the players in the player group to adjust their volumes.

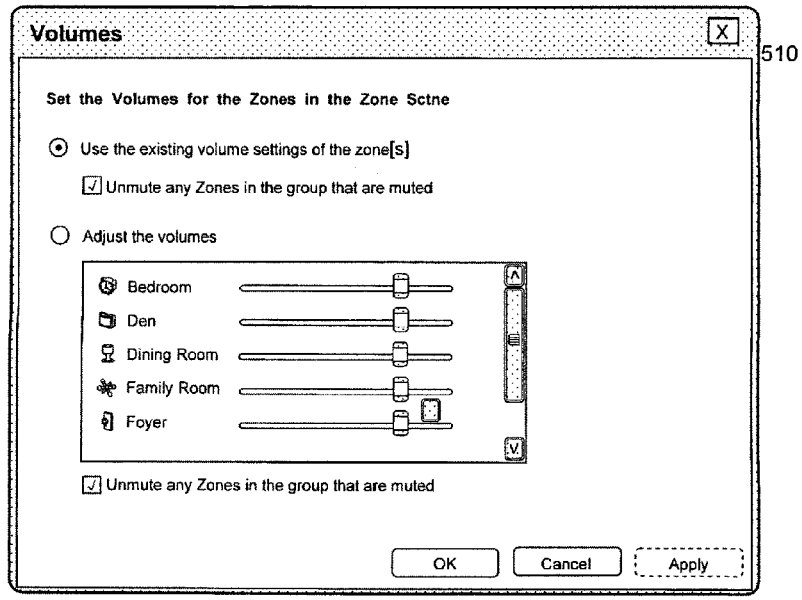

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 4, 6, 7, 8, 10, 11, 13, 14, 15 and 17-20 are determined to be patentable as amended.

Claims 2, 5, 9, 12 and 16, dependent on an amended claim, are determined to be patentable.

1. A multimedia controller including a processor, the controller configured to:
provide a user interface for a player group, wherein the player group includes a plurality of players in a local area network, and wherein each player is an independent playback device configured to playback a multimedia output from a multimedia source;
accept via the user interface an input to facilitate formation of the player group, wherein the input to facilitate formation of the player group indicates that at least two of the plurality of players in the local area network are to be included in the player group *for synchronized playback of a multimedia output from the same multimedia source*;
for [each of the plurality of players within] *any individual player in* the player group, accept via the user interface [an] *a player-specific* input to adjust a volume [associated with the] *of that individual* player, wherein the *player-specific* input to adjust the volume [associated with the] *of that individual* player causes [the corresponding independent playback device] *that individual player* to adjust its volume; and
accept via the user interface [an] *a group-level* input to adjust a volume associated with the player group, wherein the *group-level* input to adjust the volume associated with the *player* group causes [the corresponding independent playback devices] *each of the players in the* player group to adjust [their volumes] *its respective volume*.

3. The multimedia controller of claim 1, wherein the controller is further configured to accept via the user interface [an] *a group-level* input to mute the volume of the player group, wherein the *group-level* input to mute *the volume of* the player group causes *each of* the players [within] *in* the player group to mute [their] *its respective* volume.

4. The multimedia controller of [claim 3] *claim 1*, wherein the *group-level* input to [mute] *adjust the volume associated with* the player group *further* causes [the players in the player group to adjust their volumes further comprises]:
the controller [sending] *to send* an instruction to one of the players in the player group, the instruction indicating that the volumes of each of the players in the player group should be adjusted in scale.

6. The multimedia controller of claim 1, wherein the controller is further configured to accept via the user interface [an] *a player-specific* input to mute the volume of [one of the players within] *an individual player in* the player group, wherein the *player-specific* input to mute [one of the players within] *the volume of an individual player in* the player group causes [the player within the player group] *that individual player* to mute its volume.

7. The multimedia controller of claim 1, wherein the controller is further configured to save a configuration associated with the player group, wherein the configuration includes one or more of the following parameters: a) a volume level for each player in the player group, b) a mute or unmute setting for each player in the player group, and [d)] *c)* an equalization setting for each player in the player group.

8. A non-transitory computer readable storage medium including a set of instructions for execution by a processor, the set of instructions, when implemented, implement a controller configured to:
provide a user interface for a player group, wherein the player group includes a plurality of players in a local area network, and wherein each player is an independent playback device configured to playback a multimedia output from a multimedia source;
accept via the user interface an input to facilitate formation of the player group, wherein the input to facilitate formation of the player group indicates that at least two of the plurality of players in the local area network are to be included in the player group *for synchronized playback of a multimedia output from the same multimedia source*;
for [each of the plurality of players within] *an individual player in* the player group, accept via the user interface [an] *a player-specific* input to adjust a volume [associated with the] *of that individual* player, wherein the *player-specific* input to adjust the volume [associated with the] *of that individual* player causes [the corresponding independent playback device] *that individual player* to adjust its volume; and
accept via the user interface [an] *a group-level* input to adjust a volume associated with the player group, wherein the *group-level* input to adjust the volume associated with the *player* group causes [the corresponding independent playback devices] *each of the players in the* player group to adjust [their volumes] *its respective volume*.

10. The computer readable medium of claim 8, wherein the controller is further configured to accept via the user interface [an] *a group-level* input to mute the volume of the player group, wherein the *group-level* input to mute *the volume of* the player group causes *each of* the players [within] *in* the player group to mute [their] *its respective* volume.

11. The computer readable medium of [claim 10] *claim 8*, wherein the *group-level* input to [mute] *adjust the volume associated with* the player group *further* causes [the players in the player group to adjust their volumes comprises]:
the controller [sending] *to send* an instruction to one of the players in the player group, the instruction indicating that the volumes of each of the players in the player group should be adjusted in scale.

13. The computer readable medium of claim 8, wherein the controller is further configured to accept via the user interface [an] *a player-specific* input to mute the volume of [one of the players within] *an individual player in* the player group, wherein the *player-specific* input to mute [one of the players within] *the volume of an individual player in* the player group causes [the player within the player group] *that individual player* to mute its volume.

14. The computer readable medium of claim 8, wherein the controller is further configured to save a configuration associated with the player group, wherein the configuration includes one or more of the following parameters: a) a volume level for each player in the player group, b) a mute or unmute setting for each player in the player group, and [d)] *c)* an equalization setting for each player in the player group.

15. A method comprising:
   displaying a user interface for a player group, wherein the player group includes a plurality of players in a local area network, and wherein each player is an independent playback device configured to playback a multimedia output from a multimedia source;
   receiving via the user interface an input to facilitate formation of the player group, wherein the input to facilitate formation of the player group indicates that at least two of the plurality of players in the local area network are to be included in the player group *for synchronized playback of a multimedia output from the same multimedia source*;
   receiving via the user interface [an] *a player-specific* input to adjust a volume [associated with one of the players within] *of an individual player in* the player group, and responsively instructing [the corresponding independent playback device] *that individual player* to adjust its volume; and
   receiving via the user interface [an] *a group-level* input to adjust a volume associated with the player group, and responsively instructing [the corresponding independent playback devices] *each of the players* in the player group to adjust [their volumes] *its respective volume.*

17. The method of claim 15, further comprising:
   receiving via the user interface [an] *a group-level* input to mute the volume of the player group, and responsively instructing *each of* the players [within] *in* the player group to mute [their] *its respective* volume.

18. The method of claim 15, wherein instructing *each of* the players in the player group to adjust [their volumes] *its respective volume comprises*:
   sending an instruction to one of the players in the player group, the instruction indicating that the volumes of each of the players in the player group should be adjusted in scale.

19. The method of claim 15, further comprising receiving an input to *assign a* name *to* the player group, and responsively assigning the name to the player group.

20. The method of claim 15, further comprising receiving via the user interface [an] *a player-specific* input to mute the volume of [one of the players within] *an individual player in* the player group, and responsively instructing [the player within the player group] *that individual player* to mute its volume.

\* \* \* \* \*